(12) United States Patent  
Wu

(10) Patent No.: US 9,225,504 B2
(45) Date of Patent: Dec. 29, 2015

(54) CIRCUIT AND METHOD FOR CLOCK DATA RECOVERY AND CIRCUIT AND METHOD FOR ANALYZING EQUALIZED SIGNAL

(71) Applicant: REALTEK SEMICONDUCTOR CORPORATION, Hsinchu (TW)

(72) Inventor: Pei-Si Wu, Kaohsiung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/606,600

(22) Filed: Jan. 27, 2015

(65) Prior Publication Data

US 2015/0326384 A1 Nov. 12, 2015

(30) Foreign Application Priority Data

May 9, 2014 (TW) .............................. 103116492 A

(51) Int. Cl.
*H04L 7/00* (2006.01)
*H04L 27/00* (2006.01)

(52) U.S. Cl.
CPC ............ *H04L 7/0016* (2013.01); *H04L 7/0079* (2013.01)

(58) Field of Classification Search
CPC ..... H04L 7/0334; H04L 25/0319; G06F 1/10; H04J 3/0685
USPC .......... 375/355, 219, 326, 371, 375; 327/155, 327/158
See application file for complete search history.

(56) References Cited

U.S. PATENT DOCUMENTS

| 7,277,516 | B2 | 10/2007 | Chou et al. | |
|---|---|---|---|---|
| 2012/0105115 | A1* | 5/2012 | Yamamoto et al. | 327/156 |
| 2013/0329843 | A1* | 12/2013 | Takeuchi | 375/375 |
| 2014/0064744 | A1* | 3/2014 | Yoshiyama et al. | 398/202 |

OTHER PUBLICATIONS

Fulvio Spagna et al., "A 78mW 11.8Gbs serial link transceiver with adaptive RX equalization and baud-rate CDR in 32nm CMOS", ISSCC 2010 / Session 20 / Next-Generation Optical & Electrical Interfaces / 20.4.

* cited by examiner

*Primary Examiner* — Khai Tran
(74) *Attorney, Agent, or Firm* — WPAT, P.C.; Anthony King

(57) ABSTRACT

A clock data recovery method samples an input signal according to a reference clock to generate a plurality of sampling results. A first and a second sampling clocks are generated according to the reference clock. A phase difference between the two sampling clocks is larger than zero and less than half an UI and each UI corresponds to an input data. Successive UIs of the input signal are sampled according to the first and the second sampling clocks to generate a first and a second sampling results in each UI. The two sampling results are compared to generate a comparison result. An adjusting signal is generated according to the comparison result and the input data. The first and the second sampling clocks are adjusted according to the adjusting signal such that the sampling results of each UI substantially correspond to a peak value at the UI of the input signal.

20 Claims, 13 Drawing Sheets

CIRCUIT AND METHOD FOR CLOCK DATA RECOVERY AND CIRCUIT AND METHOD FOR ANALYZING EQUALIZED SIGNAL

BACKGROUND OF THE INVENTION

1. Field of the Invention

The present disclosure relates to a clock data recovery (CDR) circuit, method, an equalized signal analyzing circuit and method, especially to circuits and methods that perform CDR and analyze equalized signal of a signal equalizer based on peak values of an input signal.

2. Description of Related Art

Referring to FIGS. 1A and 1B, waveforms of sampling an input signal $D_{in}$ by a clock clk are illustrated. In FIGS. 1A and 1B, two sampling results for one input data of the input signal $D_{in}$ are generated according to the clock clk. Ideally, a center of each unit interval (UI, each corresponding to one input data) of the input signal $D_{in}$ is sampled on a rising edge of the clock clk, and an edge of each UI is sampled on a falling edge of the clock clk. As a result, relatively accurate sampling results can be obtained. Traditionally, an Alexander phase detector is used to determine whether the clock clk leads or lags the input signal $D_{in}$. As shown in FIG. 1A, one edge of the clock clk samples data D<n> (n being positive) in an UI, but the following falling edge samples at the subsequent UI instead of the edge of the corresponding UI; therefore, the Alexander phase detector determines that the clock clk lags the input signal $D_{in}$ by performing logic operation and averaging via a low-pass filter. In this case, the phase of the clock clk must be advanced (i.e., shifted to the left of FIG. 1A). On the other hand, as shown in FIG. 1B, data D<n> is sampled on a rising edge of the clock clk, but the corresponding UI, instead of the edge thereof, is sampled on the following falling edge; therefore, the Alexander phase detector determines that the clock clk leads the input signal $D_{in}$. In this case, the phase of the clock clk must be delayed (i.e., shifted to the right of FIG. 1B). Reference is made to FIG. 2, a relationship between an eye diagram of input data and the clock clk is presented. After phase shift, the clock clk and the input signal $D_{in}$ achieve an ideal phase relationship. In other words, a center of each UI of the input signal $D_{in}$ is sampled on a rising edge of the clock clk, while an edge of each UI of the input signal $D_{in}$ is sampled on a falling edge. Ideally, the sampled data generated in such case are relatively accurate. However, the waveform of the input signal $D_{in}$ received by the sampling circuit is not symmetric most of the time because of interferences at a data receiving end. A peak value within a UI is not at the center of the UI, and therefore the rising edges of the clock clk do not ideally sample at the positions of the peak values of the input signal $D_{in}$. For example, as shown in FIG. 2, the peak value of each input data is on the right half of the UI (depicted by a dotted circle). As a result, even if the clock clk samples at the center of each UI, it does not ideally sample at the positions of the peak values of the input signal $D_{in}$, which may decrease the sampling accuracy and increase bit error rate (BER).

Referring to FIG. 3, a diagram of determining a position of a peak value of the input signal $D_{in}$ is presented. Two sampling points, which are advanced and delayed by a time Tb with respect to the normal sampling point (having a sampling result h(τ)), respectively correspond to the sampling results h(τ−Tb) and h(τ+Tb), in which Tb is half of time between the two successive sampling points. By comparing the two sampling results, the relationship between the sampling clock and the input signal $D_{in}$ can be determined. If h(τ−Tb)=h(τ+Tb), the sampling points of the sampling clock are aligned with the positions of the peak values of the input signal $D_{in}$; if h(τ−Tb)>h(τ+Tb), the sampling clock lags the input signal $D_{in}$, and therefore the sampling clock must be advanced to sample at the positions of peak values of the input signal $D_{in}$; if h(τ−Tb)<h(τ+Tb), the sampling clock leads the input signal $D_{in}$, and therefore the sampling clock must be delayed to sample at the positions of peak values of the input signal $D_{in}$. Each data in this type of design requires more amplitude information; for example, 2 bits (4 levels) or even 4 bits are usually required, which results in larger circuit area, higher circuit complexity and more power consumption. Moreover, when the input signal $D_{in}$ presents asymmetric waveforms due to interferences, this design has difficulty finding the position of the peak value, which results in an increase in bit error rate.

SUMMARY OF THE INVENTION

In consideration of the imperfections of the prior art, an object of the present disclosure is to provide a CDR (clock data recovery) circuit and its related method and an equalized signal analyzing circuit and its related method so as to make an improvement to the prior art.

The present disclosure discloses a clock data recovery circuit for sampling an input signal according to a reference clock to generate a plurality of sampling results. The clock data recovery circuit includes a clock generation circuit, for generating a first sampling clock and a second sampling clock according to the reference clock, in which a phase difference between the first sampling clock and the second sampling clock is larger than 0 and smaller than half a UI of the input signal, and each UI corresponds to an input data; a sampling circuit, coupled to the clock generation circuit and receiving the input signal, for sampling successive UIs of the input signal according to the first sampling clock and the second sampling clock, in which a first sampling result and a second sampling result corresponding to the first sampling clock and the second sampling clock respectively are generated in each UI; a comparing circuit, coupled to the sampling circuit, for comparing the first sampling result and the second sampling result to generate a comparison result; and a determination circuit, coupled to the comparing circuit, for generating an adjusting signal according to the comparison result and the input data. The clock generation circuit adjusts the first sampling clock and the second sampling clock according to the adjusting signal to make at least one of the two sampling results of each UI substantially correspond to a peak value at the UI of the input signal.

The present disclosure also discloses a clock data recovery method for sampling an input signal according to a reference clock to generate a plurality of sampling results. The method includes steps of: generating a first sampling clock and a second sampling clock according to the reference clock, in which a phase difference between the first sampling clock and the second sampling clock is larger than 0 and smaller than half a UI of the input signal, and each UI corresponds to an input data; sampling successive UIs of the input signal according to the first sampling clock and the second sampling clock, in which a first sampling result and a second sampling result corresponding respectively to the first sampling clock and the second sampling clock are generated in each UI; comparing the first sampling result and the second sampling result to generate a comparison result; generating an adjusting signal according to comparison result and the input data; and adjusting the first sampling clock and the second sampling clock according to the adjusting signal to make at least one of the two sampling results of each UI substantially correspond to a peak value at the UI of the input signal.

The present disclosure further discloses an equalized signal analyzing circuit, for analyzing an equalized signal of an equalizer to generate a determination result, which represents an equalization level of the equalizer. The equalized signal analyzing circuit includes: a clock generation circuit for generating a first sampling clock and a second sampling clock according to a reference clock, in which a phase difference between the first sampling clock and the second sampling clock is larger than 0 and smaller than half a UI of the equalized signal, and each UI corresponds to an input data; a sampling circuit, coupled to the clock generation circuit and receiving the equalized signal, for sampling successive UIs of the equalized signal according to the first sampling clock and the second sampling clock, wherein a first sampling result and a second sampling result corresponding respectively to the first sampling clock and the second sampling clock are generated in each UI; a comparing circuit, coupled to the sampling circuit, for comparing the first sampling result and the second sampling result to generate a comparison result; and a determination circuit, coupled to the comparing circuit, for generating the determination result according to the comparison result and the input data.

The present disclosure further discloses an equalized signal analyzing method, for analyzing an equalized signal of an equalizer to generate a determination result, which represents an equalization level of the equalizer. The equalized signal analyzing method includes steps of: generating a first sampling clock and a second sampling clock according to a reference clock, in which a phase difference between the first sampling clock and the second sampling clock is larger than 0 and smaller than half a UI of the equalized signal, and each UI corresponds to an input data; sampling successive UIs of the equalized signal according to the first sampling clock and the second sampling clock, in which a first sampling result and a second sampling result corresponding respectively to the first sampling clock and the second sampling clock are generated in each UI; comparing the first sampling result and the second sampling result to generate a comparison result; and generating the determination result according to the comparison result and the input data.

The CDR circuit and its related method of this disclosure samples according to peak values of the input signal $D_{in}$ so as to lower the bit error rate. Compared to the prior art, the CDR circuit and its related method of this disclosure dynamically adjust the sampling point to sample at the positions of peak values of the input signal $D_{in}$. As a result, the higher sampling accuracy and lower bit error rate can be achieved. Moreover, the equalized signal analyzing circuit and its related method of this disclosure are able to determine whether the equalized signal is over-equalized or under-equalized and to provide analysis results according to which the equalizer adjusts its gain.

These and other objectives of the present disclosure no doubt become obvious to those of ordinary skill in the art after reading the following detailed description of the embodiments that are illustrated in the various figures and drawings.

DETAILED DESCRIPTION OF THE EMBODIMENTS

The following description is written by referring to terms of this technical field. If any term is defined in the specification, such term should be explained accordingly. In addition, the connection between objects or events in the following embodiments can be direct or indirect provided that these embodiments are still applicable under such connection. Said "indirect" means that an intermediate object or a physical space exists between the objects, or an intermediate event or a time interval exists between the events. The present disclosure discloses a CDR (clock data recovery) circuit and its related method and an equalized signal analyzing circuit and its related method, and the detail known in this field is omitted if such detail has little to do with the features of the present disclosure. People of ordinary skill in the art can choose components or steps equivalent to those described in this specification to carry out the present disclosure, which means that the scope of this disclosure is not limited to the embodiments in the specification. On account of that some elements of said device could be known, the detail of such elements is omitted provided that this omission nowhere dissatisfies the specification and enablement requirements. In addition, said method can be in the form of firmware and/or software which could be carried out by the device of this disclosure or the equivalent thereof; hence, the following description on the method disclosure focuses on the processes and steps instead of the hardware without dissatisfying the specification and enablement requirements.

Figure 1A:
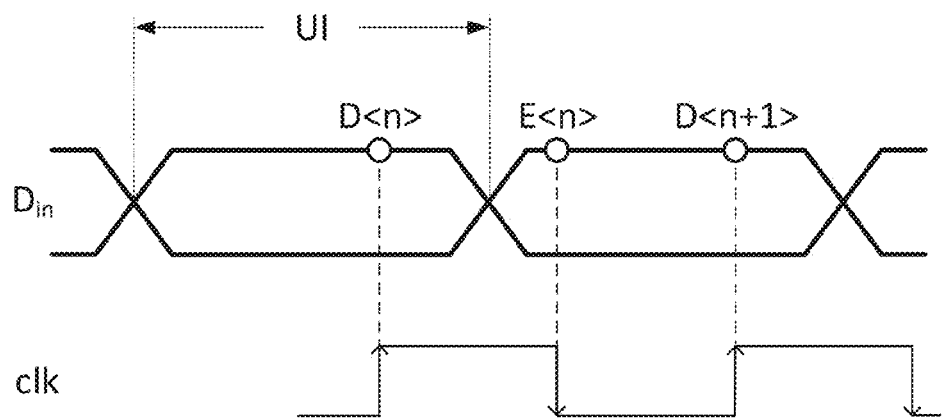
FIGS. 1A and 1B illustrate prior-art waveforms of sampling an input signal $D_{in}$ by a clock clk.
Figure 1B:
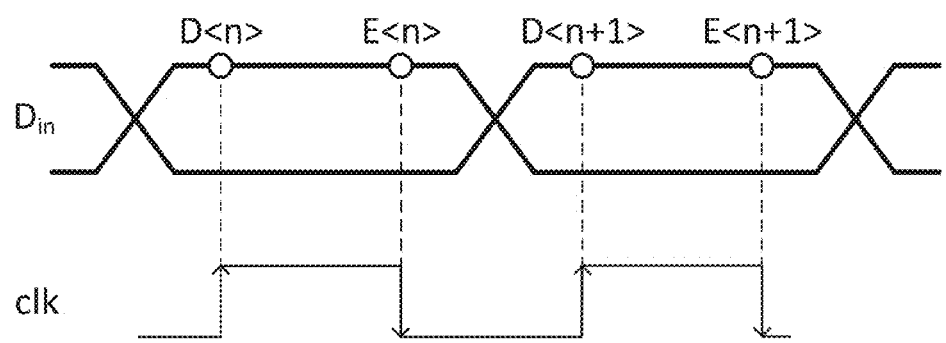
Figure 2:
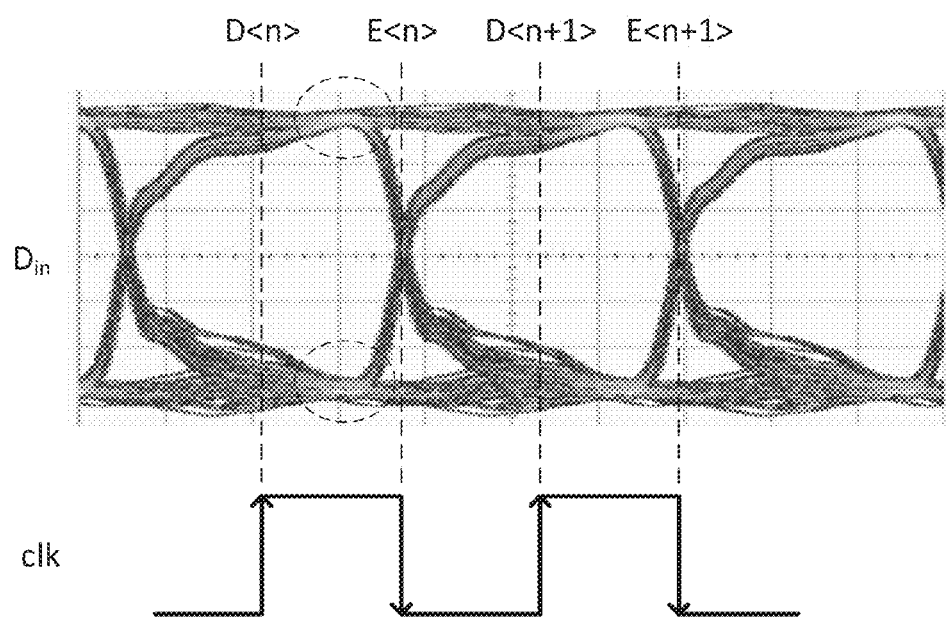
FIG. 2 illustrates a relationship between an eye diagram of input data and the clock clk.
Figure 3:
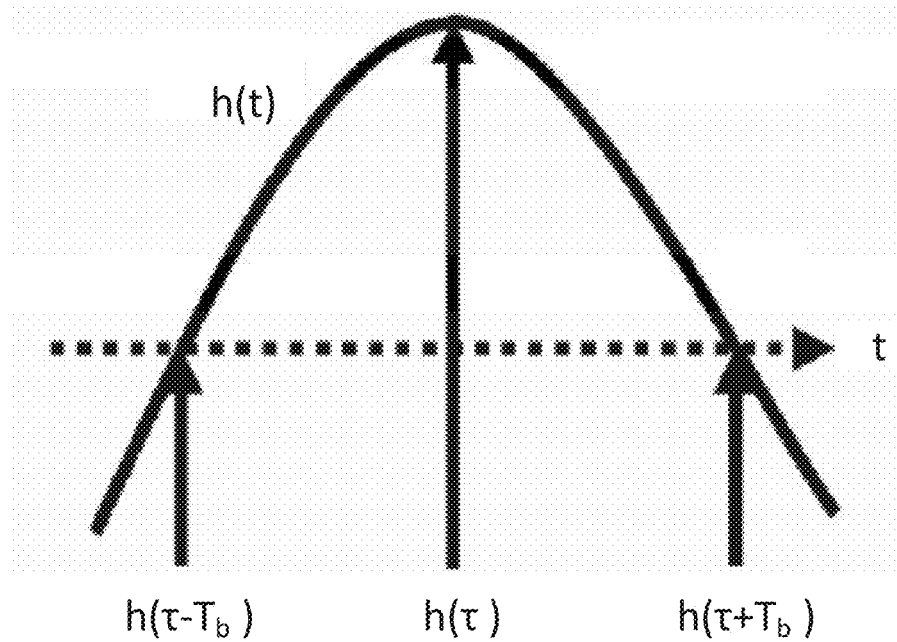
FIG. 3 illustrates a diagram of determining a position of a peak value of the input signal $D_{in}$.
Figure 4:
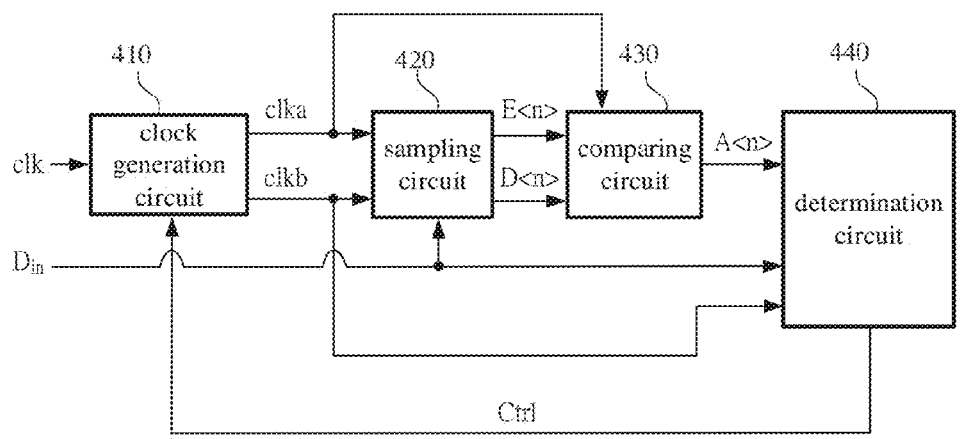
FIG. 4 illustrates a functional block diagram of a CDR circuit according to an embodiment of the present disclosure.

Referring to FIG. 4, a functional block diagram of a CDR circuit according to an embodiment of the present disclosure is presented. The CDR circuit 400 comprises a clock generation circuit 410, a sampling circuit 420, a comparing circuit 430, and a determination circuit 440. The clock generation circuit 410 generates a sampling clock clka and a sampling clock clkb according to a reference clock clk. The sampling circuit 420 is coupled to the clock generation circuit 410 and uses the sampling clock clka and the sampling clock clkb to sample the input signal $D_{in}$ to generate a sampling result E<n> and a sampling result D<n> respectively, in which n is 0 or a positive integer. The comparing circuit 430 is coupled to the sampling circuit 420 and compares the sampling result E<n> and the sampling result D<n> to generate a comparison result A<n>. The determination circuit 440, which is coupled to the comparing circuit 430 and receives the input signal $D_{in}$, generates an adjusting signal Ctrl according to the comparison result A<n> and the input signal $D_{in}$. The clock generation circuit 410 then adjusts the reference clock clk according to the adjusting signal Ctrl so as to advance or delay the phases of the sampling clock clka and the sampling clock clkb.

Figure 5:
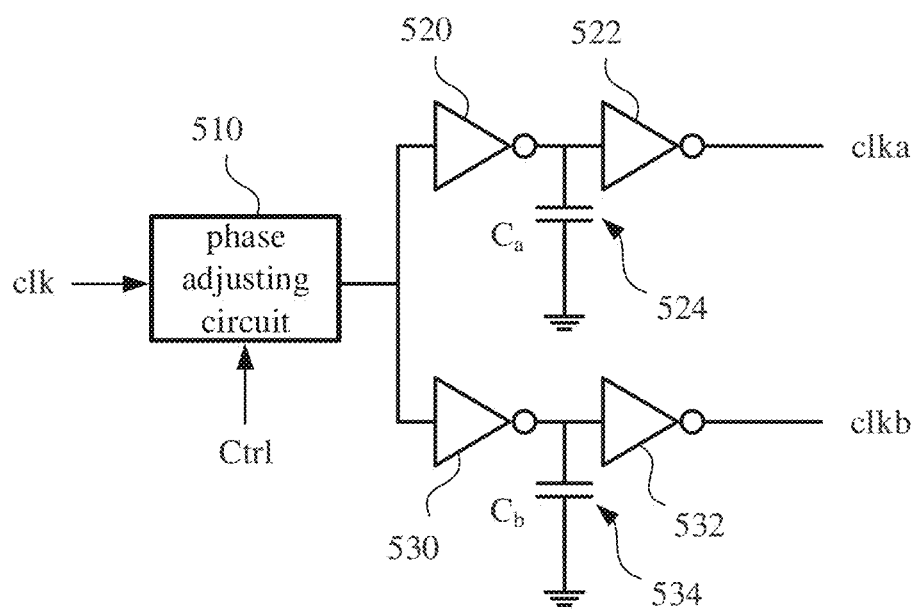
FIG. 5 illustrates a circuit diagram of the clock generation circuit 410 according to an embodiment of the present disclosure.
Figure 6:
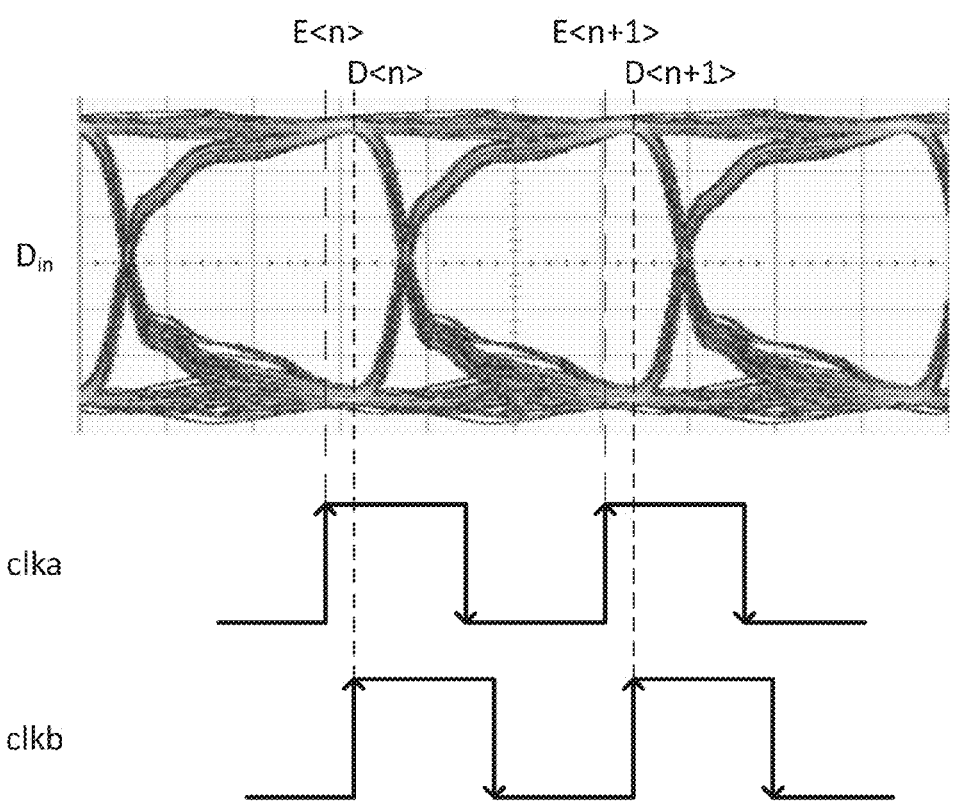
FIG. 6 illustrates a relationship among the sampling clock clka, the sampling clock clkb, and the input signal $D_{in}$.

Referring to FIG. 5, a circuit diagram of the clock generation circuit 410 according to an embodiment of the present disclosure is presented. The clock generation circuit 410 comprises a phase adjusting circuit 510, inverters (or called NOT gates) 520, 522, 530, 532 and capacitors 524, 534. The phase adjusting circuit 510 adjusts the reference clock clk according to the adjusting signal Ctrl so as to advance or delay the phase of the reference clock clk. After being adjusted by the phase adjusting circuit 510, the reference clock clk is delayed by the upper path and the lower path to generate the sampling clock clka and the sampling clock clkb respectively. The sampling clock clka has the same level with the reference clock clk after passing through the serially-connected inverters 520 and 522, but the signal charges the capacitor 524 (having capacitance $C_a$) as it passes through the inverters 520 and 522, which causes a phase delay in the signal. The lower path comprises the same components, but the capacitance $C_b$ of the capacitor 534 is different from the capacitance $C_a$ of the capacitor 524. As a result, the upper path and the lower path of the clock generation circuit 410 cause different delays to the signal, and thus there is a phase difference between the sampling clock clka and the sampling clock clkb. In the following, this disclosure is described under the presumption that the sampling clock clka leads the sampling clock clkb, but is not limited to this case. In an embodiment, the phase difference between the sampling clock clka and the sampling clock clkb is larger than 0 but smaller than half the UI of the input signal $D_{in}$. Referring to FIG. 6, a relationship among the sampling clock clka, the sampling clock clkb and the input signal $D_{in}$ is presented. Because the sampling clock clka leads the sampling clock clkb, the sampling result E<n> and the sampling result D<n> are respectively generated by these two sampling signals in a current UI (E<n+1> and D<n+1> are generated in the subsequent UI, and so on), and therefore the sampling result E<n> is earlier than the sampling result D<n>. In another embodiment, the phase difference between the sampling clock clka and the sampling clock clkb is designed as small as possible but must still be larger than 0. Usually it is implemented to be the smallest difference that hardware is able to support. In other embodiments, the clock generation circuit 410 can be implemented by the phase adjusting circuit 510 together with a phase interpolator. The principles of the phase interpolator are well-known to people having ordinary skill in the art and thus are omitted for brevity. It should be noted that when the sampling clocks are advanced, they are shifted in a direction from the lagging clock to the leading clock (i.e., to the left in this exemplary example), and that when the sampling clocks are delayed, they are shifted in a direction from the leading clock to the lagging clock (i.e., to the right in this exemplary example).

Figure 7:
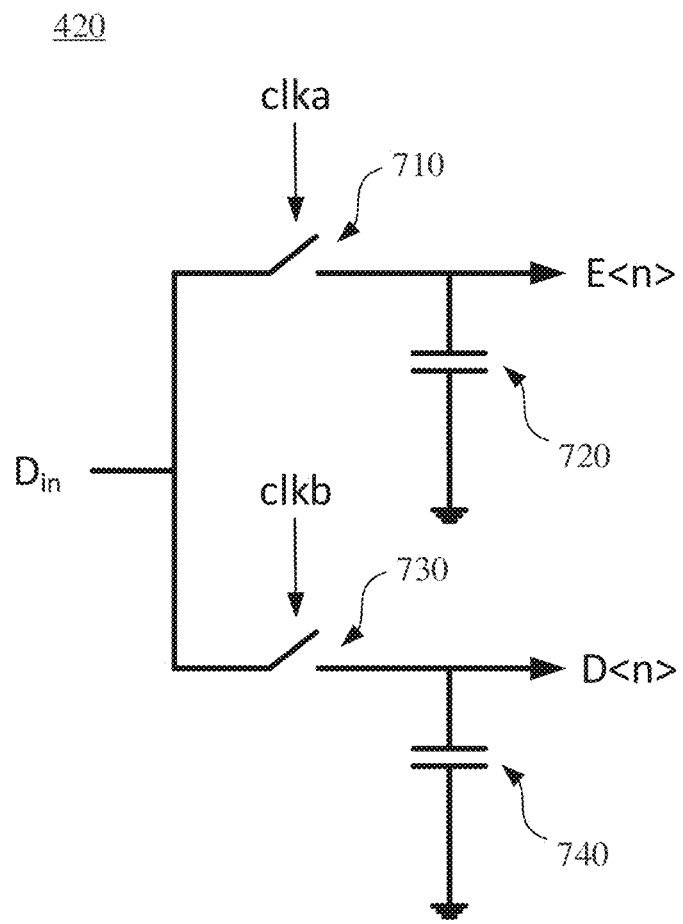
FIG. 7 illustrates a circuit diagram of the sampling circuit 420 according to an embodiment of this disclosure.

The sampling circuit 420 can be implemented by switches and capacitors. Referring to FIG. 7, a circuit diagram of the sampling circuit 420 according to an embodiment of this disclosure is presented. The sampling circuit 420 comprises a switch 710, a switch 730, a capacitor 720 and a capacitor 740. The switch 710 switches on and off according to the sampling clock clka, and the switch 730 switches on and off according to the sampling clock clkb. When the switch 710 is turned on, a terminal voltage of the capacitor 720 reflects the voltage of the input signal $D_{in}$ at the time (i.e., the sampling result E<n>). When the switch 710 is turned off, the capacitor 720 is able to keep the sampling result E<n> until the switch 710 is turned on again in the next period of the sampling clock clka. Likewise, operations of the switch 730 and the capacitor 740 in the lower path are similar to the upper path, with the difference that the switch 730 is turned on and off according to the sampling clock clkb. To be specific, the sampling result E<n> and the sampling result D<n> are analog signals, and a difference of these two represents the amount of change of the input signal $D_{in}$ in an extremely short period of time. This time period is the phase difference or time difference between the sampling clock clka and the sampling clock clkb. Then the comparing circuit 430 compares the sampling result D<n> and the sampling result E<n> and outputs the comparison result A<n>. The comparing circuit 430 can use, for example, an OP (operational amplifier) to compare the sampling result D<n> and the sampling result E<n>, and further comprises a sampling circuit, which is coupled to the output of the OP and samples the output of the OP by the sampling clock clka to obtain the comparison result A<n>. In some embodiments, the sampling circuit can be implemented by the aforementioned switch or a D flip-flop, but it is not limited thereto, and the comparison result A<n> is a digital signal with a logic value 0 or 1.

Figure 8:
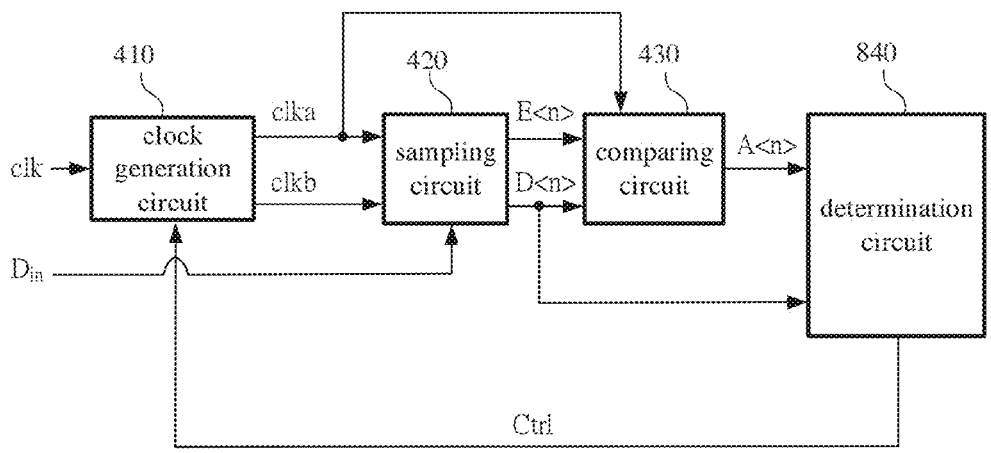
FIG. 8 illustrates a functional block diagram of a CDR circuit according to another embodiment of the present disclosure.

The determination circuit 440 is coupled to the comparing circuit 430 and receives the input signal $D_{in}$ and the sampling clock clkb. The determination circuit 440 comprises a sampling circuit which uses the sampling clock clkb to sample the input signal $D_{in}$ to generate the sampling result D<n>. To be specific, the sampling result D<n> obtained by the determination circuit 440 is digital data, which represents input data corresponding to the UI of the input signal $D_{in}$ and is typically a logic value 1 or 0 after decision. In some embodiments, the sampling circuit can be implemented by a D flip-flop, but it is not limited thereto. In another embodiment as illustrated in FIG. 8, a determination circuit 840 is coupled to the sampling circuit 420 so as to receive its output sampling result D<n> directly. In this case, the determination circuit 840 is not required to comprise an additional sampling circuit but only needs to convert the sampling result D<n> into digital data after decision. The main objective of the determination circuit 440 and the determination circuit 840 is to determine whether or not the sampling points of the sampling clock clka and the sampling clock clkb are close or equal to the positions of the peak values of the input signal $D_{in}$ according to the input data corresponding to the sampling result D<n> and the comparison result A<n>, and to generate the adjusting signal Ctrl accordingly. The clock generation circuit 410 then adjusts the reference clock clk according to the adjusting signal Ctrl so as to make the sampling points of the sampling clock clka or the sampling clock clkb close or equal to the positions of the peak values of the input signal $D_{in}$. The determination circuit 440 and the determination circuit 840 have different determining approaches depending on the implementation of the comparing circuit 430.

In an embodiment, the comparing circuit 430 compares absolute values of the sampling result D<n> and the sampling result E<n>, and the comparison result A<n> is then determined according to Table 1.

TABLE 1

| | A<n> |
|---|---|
| \|E<n>\| > \|D<n>\| | 1 |
| \|E<n>\| <= \|D<n>\| | 0 |

The determination circuit 440 and the determination circuit 840 then generate the adjusting signal Ctrl according to the comparison result A<n> and the input data corresponding to the sampling result D<n>. It should be noted that the determination circuit 440 or the determination circuit 840 outputs the adjusting signal Ctrl when the input data of the UI, to which the sampling result D<n> or the sampling result E<n> corresponds, is different from the input data of the adjacent UI. To be specific, the determination circuit 440 or the determination circuit 840 performs determination according to the comparison result A<n> and outputs the adjusting signal Ctrl when D<n−1>≠D<n> or D<n>≠D<n+1> (i.e., (D<n−1> XOR D<n>)=1 or (D<n> XOR D<n+1>)=1, XOR being an Exclusive-OR operator). The relationship among the adjusting signal Ctrl, the comparison result A<n> and the sampling result D<n> is shown in Table 2.

TABLE 2:

| | A<n> | Ctrl |
|---|---|---|
| (D<n − 1> XOR D<n>) = 1 or (D<n> XOR D<n + 1>) = 1 | 1 | Up |
| (D<n − 1> XOR D<n>) = 1 or (D<n> XOR D<n + 1>) = 1 | 0 | Dn |

Figure 9A:
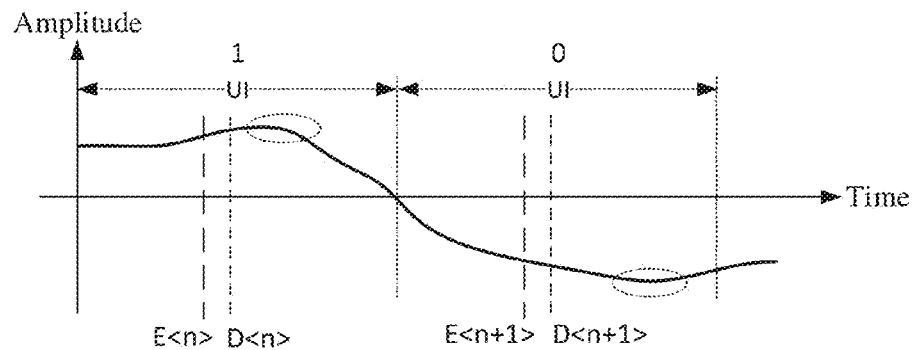
FIGS. 9A and 9B illustrate a relationship between the input signal $D_{in}$ and the sampling results E<n> and D<n>.
Figure 9B:
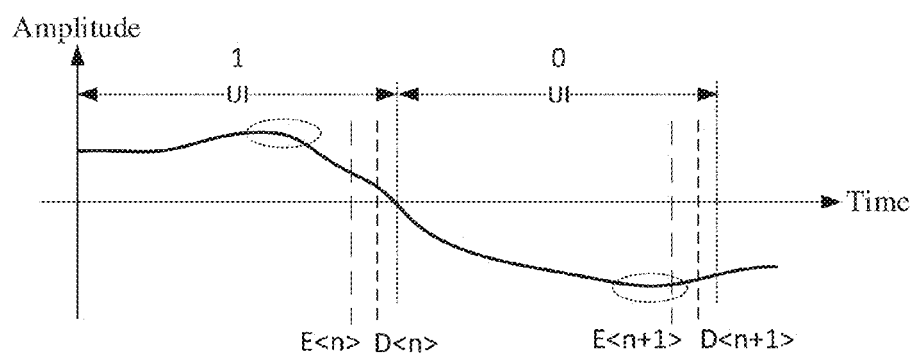

Referring to FIGS. 9A and 9B, a relationship between the input signal $D_{in}$ and the sampling results E<n> and D<n> is presented. FIG. 9A and FIG. 9B have the same input signal $D_{in}$ and each shows two UIs. The input data corresponding to the left UI with respect to the vertical axis (i.e., time axis) has a logic value 1 (high level) and the input data corresponding to the right UI has a logic value 0 (low level). Therefore, after decision, the sampling result D<n> or E<n> is a logic value 1, and the sampling result D<n+1> or E<n+1> is a logic value 0. In the example of 9A, since \|E<n>\| is smaller than \|D<n>\|, the comparison result A<n> is determined to be 0 from Table 1; further, since (D<n> XOR D<n+1>)=1, the adjusting signal Ctrl is determined to be Dn from Table 2, which means that the phases of the sampling clock clka and the sampling clock clkb should be delayed so that the sampling points of the sampling clock clka and the sampling clock clkb are closer to the positions of the peak values (depicted by the dotted circle in the figure) at the UI of the input signal $D_{in}$. Similarly, since \|E<n+1>\| is smaller than \|D<n+1>\| and the logic value corresponding to D<n+1> is different from that corresponding to D<n> (i.e., the condition (D<n−1> XOR D<n>)=1 in Table 2 is satisfied), the adjusting signal Ctrl is also determined to be Dn according to Table 1 and Table 2. In the example of FIG. 9B, since \|E<n>\| is larger than \|D<n>\| (or \|E<n+1>\| is larger than \|D<n+1>\|) and (D<n> XOR D<n+1>)=1 (or (D<n−1> XOR D<n>)=1), the adjusting signal Ctrl is determined to be Up according to Table 1 and Table 2, which means that the phases of the sampling clock clka and the sampling clock clkb should be advanced so that the sampling points of the sampling clock clka and the sampling clock clkb are closer to the positions of the peak values (depicted by the dotted circle in the figure) at the UI of the input signal $D_{in}$.

In another embodiment, the comparing circuit 430 compares the sampling result D<n> and the sampling result E<n>, and the comparison result A<n> is then determined according to Table 3.

TABLE 3

| | A<n> |
|---|---|
| E<n> > D<n> | 1 |
| E<n> <= D<n> | 0 |

The determination circuit 440 or the determination circuit 840 then generates the adjusting signal Ctrl according to the comparison result A<n> and the input data corresponding to the sampling result D<n>. It should be noted that, similar to the prior embodiment, the determination circuit 440 or the determination circuit 840 outputs the adjusting signal Ctrl when the input data of the UI, to which the sampling result D<n> or the sampling result E<n> corresponds, is different from the input data of the adjacent UI. To be specific, the determination circuit 440 or the determination circuit 840 outputs the adjusting signal Ctrl when D<n−1>*D<n> or D<n>≠D<n+1> (i.e., (D<n−1> XOR D<n>)=1 or (D<n> XOR D<n+1>)=1). The relationship among the adjusting signal Ctrl, the comparison result A<n> and the sampling result D<n> is shown in Table 4:

TABLE 4

| | A<n> | D<n> | Ctrl |
|---|---|---|---|
| (D<n − 1> XOR D<n>) = 1 or (D<n> XOR D<n + 1>) = 1 | 1 | 1 | Up |
| | | 0 | Dn |
| (D<n − 1> XOR D<n>) = 1 or (D<n> XOR D<n + 1>) = 1 | 0 | 1 | Dn |
| | | 0 | Up |

In this embodiment, taking the sampling results in FIG. 9A as an example, the sampling result E<n> is smaller than the sampling result D<n> in the left UI, and thus the comparison result A<n> is 0 according to Table 3. Because A<n>=0 and the logic value corresponding to D<n> is 1, the adjusting signal Ctrl is determined to be Dn according to Table 4. In the right UI, the sampling result E<n+1> is larger than the sampling result D<n+1> (because both E<n+1> and D<n+1> are negative at the time), and thus the comparison result A<n> is 1 according to Table 3. Because A<n>=1, and the logic value corresponding to D<n> is 0, the adjusting signal Ctrl is determined to be Dn according to Table 4. On the other hand, taking the sampling results in FIG. 9B as an example, the sampling result E<n> is larger than the sampling result D<n> in the left UI, and thus the comparison result A<n> is 1 according to Table 3. Because A<n>=1 and the logic value corresponding to D<n> is 1, the adjusting signal Ctrl is determined to be Up according to Table 4. In the right UI, the sampling result E<n+1> is smaller than the sampling result D<n+1> (because both E<n+1> and D<n+1> are negative at the time), and thus the comparison result A<n> is 0 according to Table 3. Because A<n>=0, and the logic value corresponding to D<n> is 0, the adjusting signal Ctrl is determined to be Up according to Table 4.

To sum up, the determination circuit 440 or the determination circuit 840 generates the adjusting signal Ctrl according the comparison result A<n> and the input data corresponding to the D<n> so as to advance or delay the reference clock clk. Advancing or delaying the reference clock clk naturally advances or delays the sampling clock clka and the sampling clock clkb. After each phase shift, at least one sampling point of the sampling clock clka and the sampling clock clkb is closer to the position of the peak value of the input signal $D_{in}$. After a certain period of time, the CDR circuit 400 or the CDR circuit 800 gradually converges when the adjusting signal Ctrl jumps between Up and Dn. The input data corresponding to the sampling result D<n> or to the sampling result E<n> at the time is sampled based on the peak values of the input signal $D_{in}$. It is proven that such sampling approach effectively lowers the bit error rate and thus facilitates the back-end circuits to receive more accurate input data.

Figure 10:
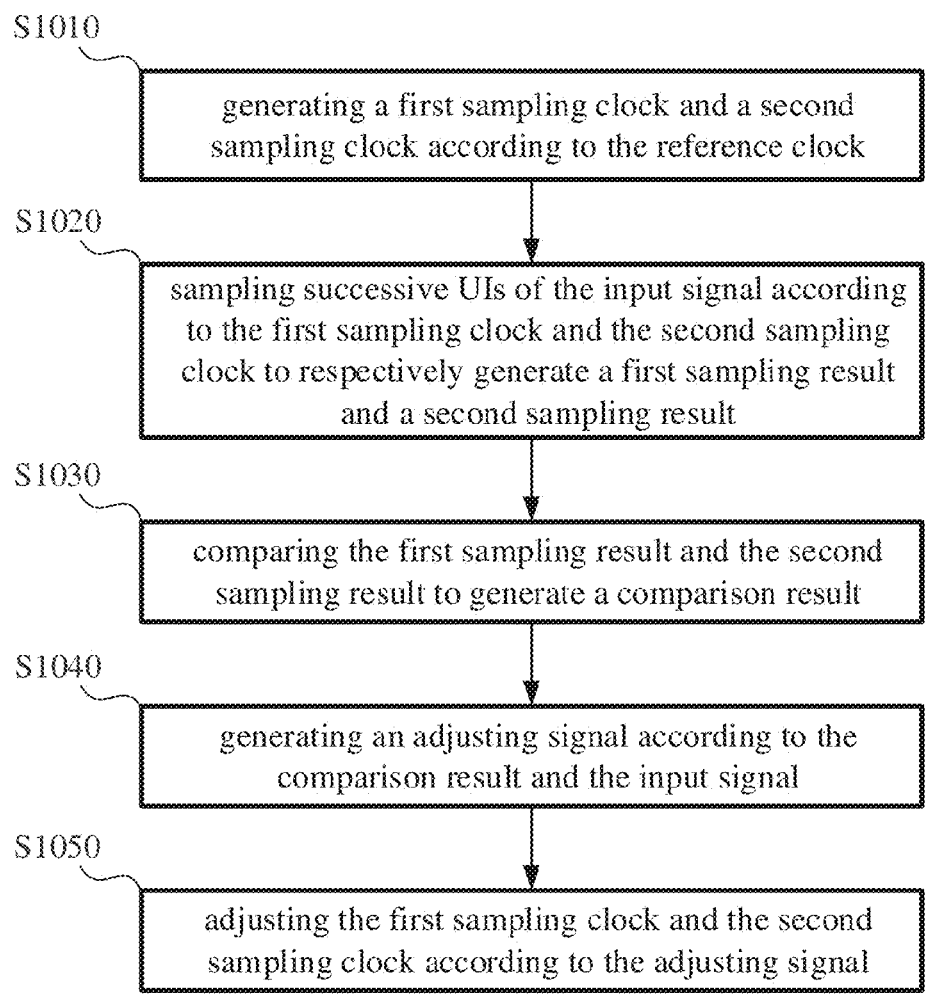
FIG. 10 illustrates a flowchart of a clock data recovery method according to an embodiment of the present disclosure.

Referring to FIG. 10, a flowchart of a clock data recovery method according to an embodiment of the present disclosure is presented. In addition to the aforementioned clock data recovery circuit, this disclosure also discloses a clock data recovery method that makes sampling points closer to the positions of the peak values of the input signal $D_{in}$ to reduce bit error rate. This method can be implemented by the CDR circuit 400 or its equivalent circuits. As shown in FIG. 10, the clock data recovery method of this disclosure comprises the following steps.

Step S1010: generating a first sampling clock clka and a second sampling clock clkb according to the reference clock clk. The first sampling clock clka and the second sampling clock clkb are generated by delaying the reference clock clk by different time periods (or phases). A phase difference between the first sampling clock clka and the second sampling clock clkb is larger than 0 and less than half a UI of the input signal $D_{in}$.

Step S1020: sampling successive UIs of the input signal $D_{in}$ according to the first sampling clock clka and the second sampling clock clkb to respectively generate a first sampling result E<n> and a second sampling result D<n>. As shown in FIG. 6, one sampling result E<n> and one sampling result D<n> are generated in a UI and other two sampling results E<n+1> and D<n+1> are generated in a subsequent UI.

Step S1030: comparing the first sampling result E<n> and the second sampling result D<n> to generate a comparison result A<n>. There are two kinds of comparing methods. One is to compare the absolute values of the first sampling result E<n> and the second sampling result D<n>, and the other is to directly compare the first sampling result E<n> and the second sampling result D<n>. More specifically, the first sampling result E<n> and the second sampling result D<n> generated in the step S1020 are analog signals which correspond to the same input data after decision. For example, the first sampling result E<n> and the second sampling result D<n> in FIG. 9A correspond to input data of logic value 1, and the first sampling result E<n+1> and the second sampling result D<n+1> of the subsequent UI correspond to input data of logic value 0. The first comparing method obtains the comparison result A<n> according to the aforementioned Table 1, and the second comparing method obtains the comparison result A<n> according to the aforementioned Table 3. The next step S1040 uses different approaches to generate adjusting signals Ctrl in response to different comparing methods in this step.

Step S1040: generating an adjusting signal Ctrl according to the comparison result A<n> and the input signal $D_{in}$. If the step S1030 uses the first method to generate the comparison result A<n>, this step generates the adjusting signal Ctrl according to Table 2, and if the step S1030 uses the second method to generate the comparison result A<n>, this step generates the adjusting signal Ctrl according to Table 4. It should be noted that despite whether the adjusting signal Ctrl is generated according to Table 2 or Table 4, the adjusting signal Ctrl is generated in this step when the following condition is satisfied: (D<n−1> XOR D<n>)=1 or (D<n> XOR D<n+1>)=1. In other words, the adjusting signal Ctrl is generated when the input data of the current UI is different from the input data of its adjacent UI. The D<n> (or D<n−1>, D<n+1>) is an input data corresponding to a UI and has a digital logic value of 1 or 0. The D<n> is actually the logic value of the sampling result (E<n> or D<n>) of the UI after decision.

Step S1050: adjusting the first sampling clock clka and the second sampling clock clkb according to the adjusting signal Ctrl. The adjusting signal Ctrl indicates that the phases of the first sampling clock clka and the second clkb should be advanced (Up) or delayed (Dn) so that the sampling point(s) of the first sampling clock clka and/or the second sampling clock clkb is (are) close or equal to the position of the peak value at the UI of the input signal $D_{in}$.

The above steps are repeated, and the adjusting signal Ctrl converges, which means the adjusting signal Ctrl jumps between Up and Dn continuously. At the time, the sampling point(s) of the first sampling clock clka and/or the second sampling clock clkb is (are) very close or equal to the position of the peak value at the UI of the input signal $D_{in}$. As a result, a bit error rate becomes lower despite whether the sampling results are generated according to the first sampling clock clka or the second sampling clock clkb.

Figure 11:
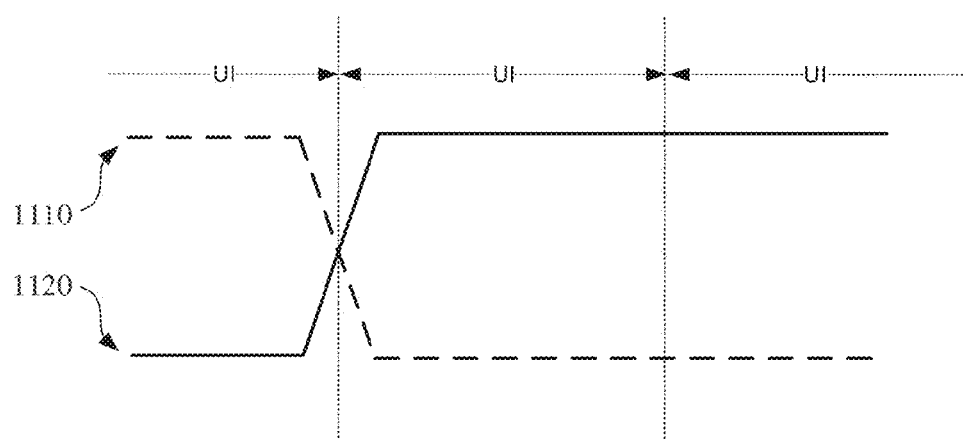
FIG. 11 illustrates an ideal waveform of level transitions in three successive UIs of the input signal $D_{in}$.
Figure 12A:
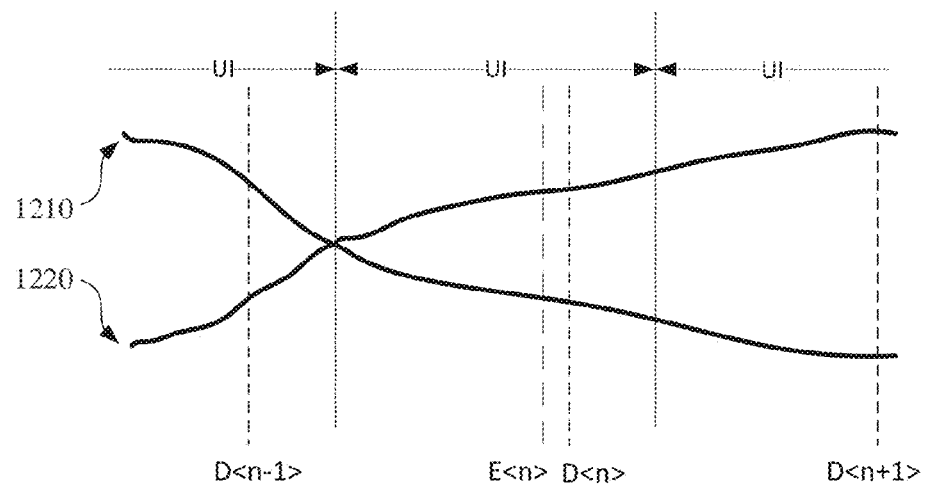
FIGS. 12A and 12B illustrate another relationship between the input signal $D_{in}$ and the sampling result E<n> and the sampling result D<n>.
Figure 12B:
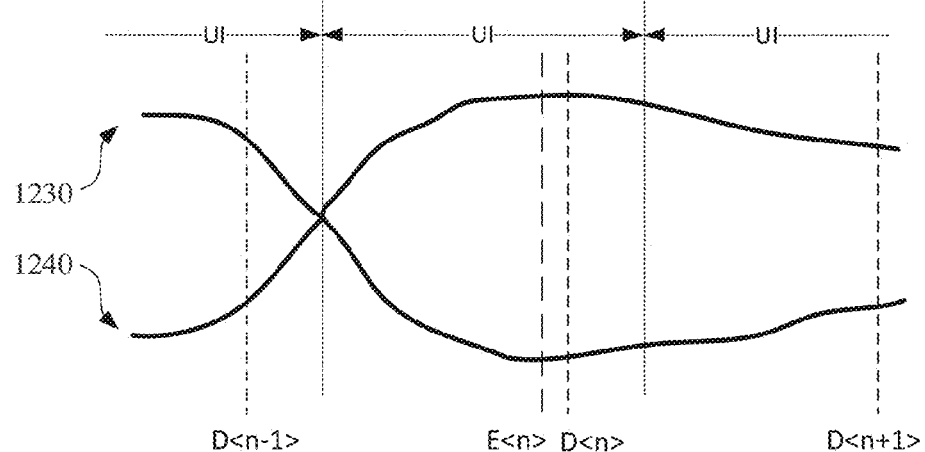

The circuit and method of this disclosure can be applied to not only clock data recovery but also the analysis of equalized signals so as to determine whether the equalized signals are under-equalized or over-equalized. Referring to FIG. 11, an ideal waveform of level transitions in three successive UIs of the input signal $D_{in}$ is presented. The curve 1110 stands for an input signal $D_{in}$ that has input data 1, 0 and 0 for the three UIs while the curve 1120 stands for an input signal $D_{in}$ that has input data 0, 1, and 1. The input signal $D_{in}$ experiences channel fading and other interferences during transmission, and different frequency components of the input signal $D_{in}$ suffer different levels of attenuation, which causes less distinguishable transition in the time domain, to be specific, in the middle UI shown in FIG. 11. A purpose of an equalizer is to compensate different frequency components. Referring to FIGS. 12A and 12B, another relationship between the input signal $D_{in}$ and the sampling result E<n> and the sampling result D<n> is presented. The solid curves in FIGS. 12A and 12B stand for equalized signals of an equalizer. FIG. 12A is the case of under-equalization (a gain of the equalizer being too low) and FIG. 12B is the case of over-equalization (a gain of the equalizer being too high). This disclosure also discloses an equalized signal analyzing circuit and its related method to determine whether the compensated result of an equalizer is good enough. In practical, with a modification to the logics of the determination circuit 440 of the CDR circuit 400 and the determination circuit 840 of the CDR circuit 800, the CDR circuit 400 in FIG. 4 and the CDR circuit 800 in FIG. 8 can be used to analyze equalized signals. It should be noted that when the CDR circuit 400 in FIG. 4 and the CDR circuit 800 in FIG. 8 are used for analyzing equalized signals, the determination circuit 440 and the determination circuit 840 generate a determination result G instead of the adjusting signal Ctrl. Thus, the determination circuit 440 and the determination circuit 840 are no longer coupled to the clock generation circuit 410 but output the determination result G to an equalizer instead.

In this embodiment, the comparing circuit 430 compares the sampling result E<n> and the sampling result D<n> according to the first comparing method, i.e., comparing the absolute values of the sampling result E<n> and the sampling result D<n>, and generates the comparison result A<n> according to Table 1. The determination circuit 440 and the determination circuit 840 generate the determination result G according to the comparison result A<n> and the input signal $D_{in}$ (or the sampling result D<n>). The determination result G indicates whether an equalized signal is over-equalized or under-equalized. The determination circuit 440 and the determination circuit 840 generate the determination result G when the following condition is satisfied: $D<n-1>\ne D<n>$ and $D<n>=D<n+1>$ (i.e., $(D<n-1>$ XOR $D<n>)=1$ and $(D<n>$ XNOR $D<n+1>)=1$, XNOR being an Exclusive-NOR operator). In other words, when a current UI, to which the sampling result $E<n>$ and the sampling result $D<n>$ correspond, has a different input data from the prior UI and the same input data as the subsequent UI, the determination circuit 440 and the determination circuit 840 generate the determination result G. A relationship among the determination result G, the comparison result $A<n>$ and the sampling result $D<n>$ is shown in Table 5.

TABLE 5

| | $A<n>$ | G |
|---|---|---|
| $(D<n-1>$ XOR $D<n>) = 1$ and $(D<n>$ XNOR $D<n+1>) = 1$ | 1 | Dn |
| $(D<n-1>$ XOR $D<n>) = 1$ and $(D<n>$ XNOR $D<n+1>) = 1$ | 0 | Up |

As shown in FIG. 12A, because $|E<n>|$ is smaller than $|D<n>|$ for both curve 1210 and curve 1220, the comparing circuit 430 outputs the comparison result $A<n>$ of value 0 according to Table 1, and then the determination circuit 440 and the determination circuit 840 generates the determination result G of "Up" according to Table 5 (which stands for under-equalization). On the contrary, as shown in FIG. 12B, $|E<n>|$ is larger than $|D<n>|$ for both curve 1230 and curve 1240, and the comparing circuit 430 outputs the comparison result $A<n>$ of value 1 according to Table 1. Then, the determination circuit 440 and the determination circuit 840 generate the determination result G of "Dn" according to Table 5 (which stands for over-equalization).

Figure 13:
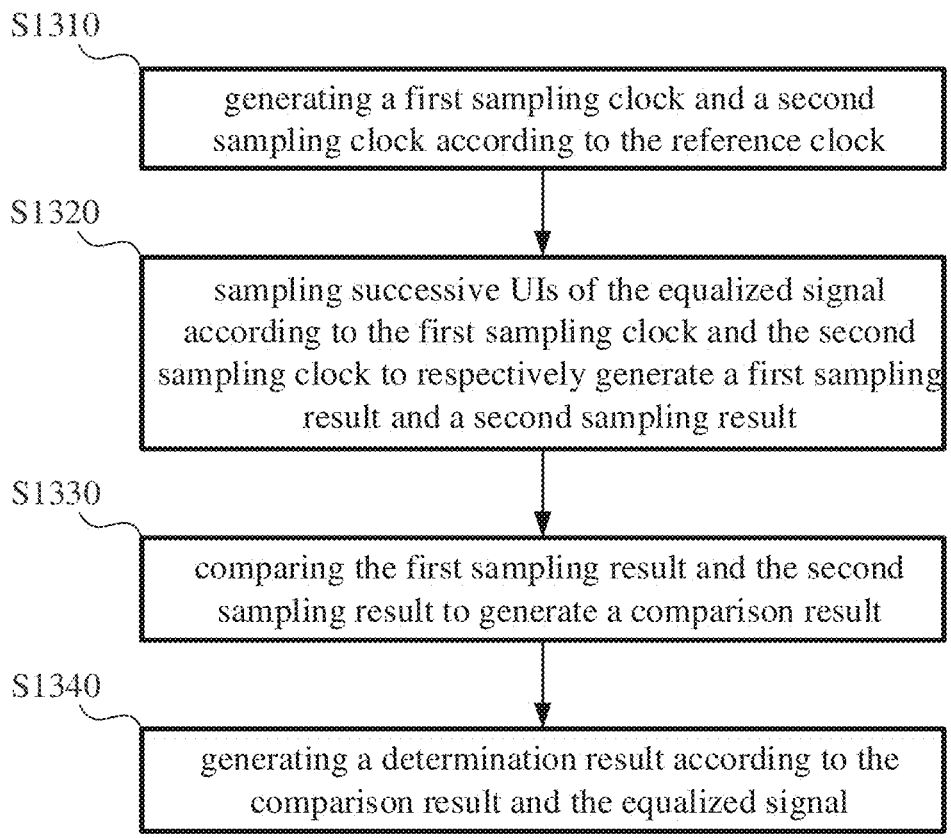
FIG. 13 illustrates a flowchart of a method of analyzing an equalized signal according to an embodiment of this disclosure.

Referring to FIG. 13, a flowchart of a method of analyzing an equalized signal according to an embodiment of this disclosure is presented. Basically, the steps S1310·S1340 are similar to the corresponding steps S1010·S1040 in FIG. 10, but the step S1330 uses only the first comparing method. Thus the step S1340 has only one determination method, namely, the method corresponding to Table 5. In the step S1340, the determination result G is generated when $(D<n-1>$ XOR $D<n>)=1$ and $(D<n>$ XNOR $D<n+1>)=1$. The $D<n>$ (or $D<n-1>$, $D<n+1>$) is an input data corresponding to the UI and has a digital logic value of 1 or 0. The $D<n>$ is actually the logic value of the sampling result ($E<n>$ or $D<n>$) of the UI after decision.

In summary, the equalized signal analyzing circuit and its related method of this disclosure simply uses the sampling result $E<n>$, the sampling result $D<n>$ and the input data corresponding to the UI to determine the equalization level of an equalizer. In an embodiment, the input signal $D_{in}$ is an equalized signal. In other words, the determination circuit 440 and the determination circuit 840 generate the adjusting signal Ctrl according to the logic of Table 2 or Table 4 and generate the determination result G according to the logic of Table 5. When the circuit or the method of this disclosure is applied to a signal receiving end, the signal receiving end is able to adjust the sampling point of a sampling clock to the position of the peak values of the input signal and to adjust a gain of an equalizer. Therefore, the original data can be restored more accurately.

Since people of ordinary skill in the art can appreciate the implementation detail and the modification thereto of the method(s) of FIG. 10 and FIG. 13 through the disclosure of the device(s) of FIGS. 4 to 8, repeated and redundant description is thus omitted. It should be noted that there is no step sequence limitation for the method(s) as long as the execution of each step is applicable. Furthermore, the shape, size, and ratio of any element and the step sequence of any flow chart in the disclosed figures are just exemplary for understanding, not for limiting the scope of this disclosure. In addition, each aforementioned embodiment may include one or more features; however, this doesn't mean that one carrying out the present disclosure should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation realized, so as to increase the flexibility of carrying out the present disclosure.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A clock data recovery circuit for sampling an input signal according to a reference clock to generate a plurality of sampling results, comprising:
   a clock generation circuit, for generating a first sampling clock and a second sampling clock according to the reference clock, wherein a phase difference between the first sampling clock and the second sampling clock is larger than 0 and smaller than half a UI (unit interval) of the input signal, and each UI corresponds to an input data;
   a sampling circuit, coupled to the clock generation circuit and receiving the input signal, for sampling successive UIs of the input signal according to the first sampling clock and the second sampling clock, wherein a first sampling result and a second sampling result corresponding respectively to the first sampling clock and the second sampling clock are generated in each UI;
   a comparing circuit, coupled to the sampling circuit, for comparing the first sampling result and the second sampling result to generate a comparison result; and
   a determination circuit, coupled to the comparing circuit, for generating an adjusting signal according to the comparison result and the input data;
   wherein the clock generation circuit adjusts the first sampling clock and the second sampling clock according to the adjusting signal to make at least one of the two sampling results of each UI substantially correspond to a peak value at the UI of the input signal.

2. The clock data recovery circuit of claim 1, wherein the comparing circuit compares the absolute values of the first sampling result and of the second sampling result, and the determination circuit outputs the adjusting signal when the input data of one UI, to which the first sampling result and the second sampling result correspond, is different from the input data of an adjacent UI.

3. The clock data recovery circuit of claim 2, wherein the first sampling clock leads the second sampling clock.

4. The clock data recovery circuit of claim 3, wherein when the comparison result indicates that the absolute value of the first sampling result is larger than the absolute value of the second sampling result, the adjusting signal controls the clock generation circuit to advance the phases of the first sampling clock and the second sampling clock.

5. The clock data recovery circuit of claim 3, wherein when the comparison result indicates that the absolute value of the first sampling result is smaller than the absolute value of the second sampling result, the adjusting signal controls the clock generation circuit to delay the phases of the first sampling clock and the second sampling clock.

6. The clock data recovery circuit of claim 1, wherein the comparing circuit compares the first sampling result and the second sampling result, and the determination circuit outputs the adjusting signal when the input data of a UI, to which the first sampling result and the second sampling result correspond, is different from the input data of an adjacent UI, the first sampling clock leads the second sampling clock, and when one of the following situations occurs, the adjusting signal outputted by the determination circuit controls the clock generation circuit to advance the phases of the first sampling clock and the second sampling clock:
when the comparison result indicates that the first sampling result is larger than the second sampling result and the first or the second sampling result indicates that the input data of the UI, to which the first or the second sampling result corresponds, is at a high level; and
when the comparison result indicates that the first sampling result is smaller than the second sampling result and the first or the second sampling result indicates that the input data of the UI, to which the first or the second sampling result corresponds, is at a low level.

7. The clock data recovery circuit of claim 1, wherein the comparing circuit compares the first sampling result and the second sampling result, and the determination circuit outputs the adjusting signal when the input data of a UI, to which the first sampling result and the second sampling result correspond, is different from the input data of an adjacent UI, the first sampling clock leads the second sampling clock, and when one of the following situations occurs, the adjusting signal outputted by the determination circuit controls the clock generation circuit to delay the phases of the first sampling clock and the second sampling clock:
when the comparison result indicates that the first sampling result is larger than the second sampling result and the first or the second sampling result indicates that the input data of the UI, to which the first or the second sampling result corresponds, is at a low level; and
when the comparison result indicates that the first sampling result is smaller than the second sampling result and the first or the second sampling result indicates that the input data of the UI, to which the first or the second sampling result corresponds, is at a high level.

8. The clock data recovery circuit of claim 1, wherein the clock generation circuit comprises:
a phase adjusting circuit, coupled to the reference clock, for adjusting the phase of the reference clock;
a first inverter with an input coupled to the phase adjusting circuit;
a first capacitor, coupled between an output of the first inverter and a reference level;
a second inverter with an input coupled to the output of the first inverter and an output outputting the first sampling clock;
a third inverter with an input coupled to the phase adjusting circuit;
a second capacitor, coupled between an output of the third inverter and the reference level; and
a fourth inverter with an input coupled to the output of the third inverter and an output outputting the second sampling clock;
wherein the capacitance of the first capacitor is different from the capacitance of the second capacitor.

9. A clock data recovery method, for sampling an input signal according to a reference clock to generate a plurality of sampling results, comprising:
generating a first sampling clock and a second sampling clock according to the reference clock, wherein a phase difference between the first sampling clock and the second sampling clock is larger than 0 and smaller than half a UI of the input signal, and each UI corresponds to an input data;
sampling successive UIs of the input signal according to the first sampling clock and the second sampling clock, wherein a first sampling result and a second sampling result corresponding respectively to the first sampling clock and the second sampling clock are generated in each UI;
comparing the first sampling result and the second sampling result to generate a comparison result;
generating an adjusting signal according to comparison result and the input data; and
adjusting the first sampling clock and the second sampling clock according to the adjusting signal to make at least one of the two sampling results of each UI substantially correspond to a peak value at the UI of the input signal.

10. The clock data recovery method of claim 9, wherein the step of comparing the first sampling result and the second sampling result compares the absolute values of the first sampling result and of the second sampling result, and the step of generating the adjusting signal according to comparison result and the input data outputs the adjusting signal when the input data of one UI, to which the first sampling result and the second sampling result correspond, is different from the input data of an adjacent UI.

11. The clock data recovery method of claim 10, wherein the first sampling clock leads the second sampling clock.

12. The clock data recovery method of claim 11, wherein when the comparison result indicates that the absolute value of the first sampling result is larger than the absolute value of the second sampling result, the step of adjusting the first sampling clock and the second sampling clock according to the adjusting signal advances the phases of the first sampling clock and the second sampling clock according to the adjusting signal.

13. The clock data recovery method of claim 11, wherein when the comparison result indicates that the absolute value of the first sampling result is smaller than the absolute value of the second sampling result, the step of adjusting the first sampling clock and the second sampling clock according to the adjusting signal delays the phases of the first sampling clock and the second sampling clock according to the adjusting signal.

14. The clock data recovery method of claim 9, wherein the step of comparing the first sampling result and the second sampling result compares the first sampling result and the second sampling result and the step of generating the adjusting signal according to the comparison result and the input data outputs the adjusting signal when the input data of a UI, to which the first sampling result and the second sampling result correspond, is different from the input data of an adjacent UI, the first sampling clock leads the second sampling clock, and when one of the following situations occurs, the step of adjusting the first sampling clock and the second sampling clock according to the adjusting signal advances the phases of the first sampling clock and the second sampling clock:
when the comparison result indicates that the first sampling result is larger than the second sampling result and the first or the second sampling result indicates that the input data of the UI, to which the first or the second sampling result corresponds, is at a high level; and
when the comparison result indicates that the first sampling result is smaller than the second sampling result and the first or the second sampling result indicates that the input data of the UI, to which the first or the second sampling result corresponds, is at a low level.

15. The clock data recovery method of claim 9, wherein the step of comparing the first sampling result and the second sampling result compares the first sampling result and the second sampling result, and the step of generating the adjusting signal according to the comparison result and the input data outputs the adjusting signal when the input data of a UI, to which the first sampling result and the second sampling result correspond, is different from the input data of an adjacent UI, the first sampling clock leads the second sampling clock, and when one of the following situations occurs, the step of adjusting the first sampling clock and the second sampling clock according to the adjusting signal delays the phases of the first sampling clock and the second sampling clock:
when the comparison result indicates that the first sampling result is larger than the second sampling result and the first or the second sampling result indicates that the input data of the UI, to which the first or the second sampling result corresponds, is at a low level; and
when the comparison result indicates that the first sampling result is smaller than the second sampling result and the first or the second sampling result indicates that the input data of the UI, to which the first or the second sampling result corresponds, is at a high level.

16. An equalized signal analyzing circuit, for analyzing an equalized signal of an equalizer to generate a determination result, which represents an equalization level of the equalizer, the equalized signal analyzing circuit comprising:
a clock generation circuit for generating a first sampling clock and a second sampling clock according to a reference clock, wherein a phase difference between the first sampling clock and the second sampling clock is larger than 0 and smaller than half a UI of the equalized signal, and each UI corresponds to an input data;
a sampling circuit, coupled to the clock generation circuit and receiving the equalized signal, for sampling successive UIs of the equalized signal according to the first sampling clock and the second sampling clock, wherein a first sampling result and a second sampling result corresponding respectively to the first sampling clock and the second sampling clock are generated in each UI;
a comparing circuit, coupled to the sampling circuit, for comparing the first sampling result and the second sampling result to generate a comparison result; and
a determination circuit, coupled to the comparing circuit, for generating the determination result according to the comparison result and the input data.

17. The equalized signal analyzing circuit of claim 16, wherein the comparing circuit compares the absolute values of the first sampling result and of the second sampling result, and the determination circuit outputs the determination result when the input data of one UI, to which the first sampling result and the second sampling result correspond, is different from the input data of a prior UI and the same as the input data of a subsequent UI, wherein the first sampling clock leads the second sampling clock.

18. The equalized signal analyzing circuit of claim 17, wherein when the comparison result indicates that the absolute value of the first sampling result is larger than the absolute value of the second sampling result, the determination result indicates that the equalized signal is over-equalized.

19. The equalized signal analyzing circuit of claim 17, wherein when the comparison result indicates that the absolute value of the first sampling result is smaller than the absolute value of the second sampling result, the determination result indicates that the equalized signal is under-equalized.

20. The equalized signal analyzing circuit of claim 16, wherein the clock generation circuit comprises:
a phase adjusting circuit, coupled to the reference clock, for adjusting the phase of the reference clock;
a first inverter with an input coupled to the phase adjusting circuit;
a first capacitor, coupled between an output of the first inverter and a reference level;
a second inverter with an input coupled to the output of the first inverter and an output outputting the first sampling clock;
a third inverter with an input coupled to the phase adjusting circuit;
a second capacitor, coupled between an output of the third inverter and the reference level; and
a fourth inverter with an input coupled to the output of the third inverter and an output outputting the second sampling clock;
wherein the capacitance of the first capacitor is different from the capacitance of the second capacitor.

* * * * *